United States Patent Office.

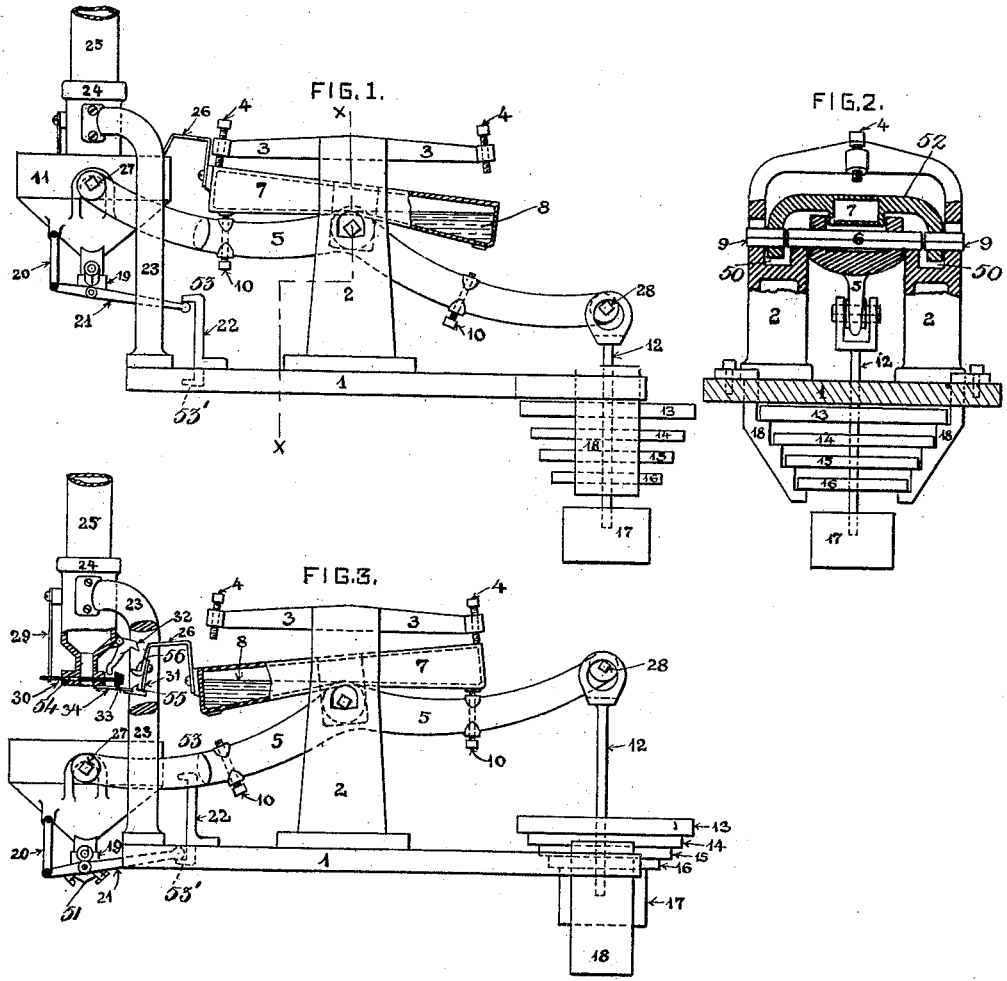

FRANKLIN W. OLIN, OF ALTON, ILLINOIS.

WEIGHING APPARATUS.

SPECIFICATION forming part of Letters Patent No. 605,127, dated June 7, 1898.

Application filed March 5, 1896. Serial No. 581,939. (No model.)

*To all whom it may concern:*

Be it known that I, FRANKLIN W. OLIN, a citizen of the United States, residing at Alton, in the county of Madison and State of Illinois, have invented certain new and useful Improvements in Weighing Apparatus, of which the following is a full, clear, and exact description, reference being had to the accompanying drawings, forming a part thereof.

My invention has relation to improvements in weighing apparatus; and it consists in the novel arrangement and combination of parts more fully set forth in the specification and pointed out in the claims.

In the drawings, Figure 1 is a side elevation of my improvement. Fig. 2 is a combined section and elevation, the section being taken on the line $xx$ of Fig. 1; and Fig. 3 is a view similar to Fig. 1, showing the weighing-pan in its lowest position.

The object of my invention is to construct a weighing apparatus, designed especially for the weighing of shot or similar material, wherein most accurate and constant results are obtained.

Another object is to construct a very sensitive scale and one which shall control, incident to the weighing operation, the source of supply of the shot fed to the weighing-pan forming part of the present apparatus. In detail the device may be described as follows:

Referring to the drawings, 1 represents a base-plate, on which is mounted the inverted-U-shaped frame or standard 2, the base of the frame being provided with the arms 3 3, extending at right angles to the general plane in which the arms of the frame are disposed. The free ends of the arms 3 3 are provided with adjustable screw-threaded bolts 4, whose lower ends incline outwardly from said arms. Pivoted along the inner faces of the frame and on top of what constitute the inner bounding walls of certain cut-away portions 50, formed in the frame, is a beam 5, whose arms on either side of the knife-edged fulcrum-bar 6 are concaved downward. Fulcrumed or pivoted on the knife-edged arms 9, alining with the bar 6, and within suitable openings of the frame opposite the ends of said bar 6 is a closed oblong mercury-receptacle 7, having a flat top, its bottom, however, inclining downward from either side of the pivotal point thereof, the inclined bottom surfaces connecting with the end walls of the vessel, which are substantially at right angles to the flat top. The mercury-receptacle is connected to its fulcrum-arms 9 by the arms constituting the yoke 52, formed integrally with said receptacle. Passing through and carried by the arms of the beam 5 are the adjusting impact-bolts 10, adapted with the rocking of the beam to alternately strike against the bottom of the mercury-receptacle for a purpose to be hereinafter more fully described. From the end of a rod 12, carried by the end of one of the arms of the beam 5, is a balance-weight 17, the base-plate 1 being cut away or forked to allow said rod to pass therethrough, and bolted to the said forked ends of the base-plate are inclined plates 18, formed each with a series of alining ledges or saddles, between the several pairs of which are supported a series of weights 13 14 15 16, whose aggregate weight, together with the weight of the mercury in the receptacle 7, corresponds to that of the shot to be weighed in the pan 11, carried or suspended between the forked ends of the opposite arm of the beam 5 and suspended from the knife-edges 27 at the ends of the members of said fork. Pivoted at the open mouth of the pan 11 and adapted to normally close said mouth are the jaws 19. The latter are adapted to be opened by a wedge-shaped plate 51, carried by the controlling-lever 21, whose short arm is pivotally secured to the lower end of a link 20, depending pivotally from the inclined bottom of the weighing-pan. The free end of the controlling-lever is adapted to come alternately in contact with the terminal lugs 53 53' of a standard or tripping-bar 22, bolted to the base-plate 1 and operating as subsequently to be more fully described.

The delivery-pipe 25 conveys the shot to the hopper 24, made secure and rigid by the brackets 23, to the upper ends of which it is secured. The mouth of the hopper is adapted to be closed by a plate 30, which is normally held in said closed position by a spring-arm 29, secured along the outer wall of the hopper and whose free end is connected to the said sliding plate 30. The latter is provided with an opening 54, which is normally held withdrawn from under the mouth of the hopper by the spring-arm 29. The inner projecting end of the plate is provided with a conical head 33, which when the plate is shifted to a position to bring the opening 54 in the line of the mouth of the hopper (or, in other words, in position to open the hopper) is adapted to be retained in said open position by the base of the conical head being engaged by the terminal catch 55 of the spring plate or arm 34, secured to the wall of the hopper at the mouth thereof. The manner in which the plate 30 is thus withdrawn to open the hopper is as follows: Pivoted along the wall of the hopper above the projecting conical head 33 is a bell-crank trigger 32, the end of whose long arm is permanently interposed between the lower edge of the mouth of the hopper and the base of the conical head 33. Secured to the mercury-receptacle at the end of the wall adjacent to the hopper is a bent arm 26, whose free end is provided with a finger 56, adapted to engage the under surface of the short arm of the trigger, and which is further provided with an extension 31, adapted to depress the free end of the spring-arm 34 and catch 55, carried thereby, and release the latter from the base of the conical head, as subsequently to be more fully explained.

The operation is as follows: Normally the balance-weight 17, depending from one end of the beam 5, holds the empty pan 11 in an elevated position directly under the open mouth of the hopper 24, the mouth of said hopper being held open by reason of the fact that as the pan 11 swings to its highest position the upper projecting end of the bolt 10 strikes against the inclined bottom of the mercury-receptacle 7, causing the body of mercury 8 which has flowed to that end of the receptacle nearest the hopper to gradually shift to the opposite end of the receptacle, as seen in Fig. 1, thus shifting the center of gravity of the receptacle and gradually tilting the latter to the position indicated in Fig. 1. By this tilting movement of the receptacle the arm 26 is carried upward, causing the finger 56 thereof to engage the short arm of the bell-crank trigger, whereby the long arm of said trigger is rocked so as to pull upon the conical head 33 of the plate 30, drawing the latter far enough to permit the catch 55 of the spring-arm 34 to engage the base of the head 33, and thus holding the opening 54 of the closing-plate in line with the mouth of the hopper. The operator by the manipulation of any suitable valve (not shown) controlling the passage of the pipe 25 at any convenient point thereupon allows the shot to drop through the open mouth of the hopper, gradually filling the pan, which latter now begins to tilt the beam 5 in the opposite direction, the balance-weight 17 picking up successively the weights 16, 15, 14, and 13, disposed on the ledges of the plates 18, until the entire series have been picked up, whereupon the impact-bolt carried by that arm of the beam now impinges against the inclined bottom of the opposite end of the mercury-receptacle, gradually causing a shifting of its fluid contents in the reverse direction, whereby the receptacle is tilted to the position shown in Fig. 3, when the shot contained in the pan will balance the combined series of weights 13 to 17 and also the mercury contents of the receptacle 7, (the tilting of the receptacle being limited in each case by the bolts 4, carried at the ends of the arms 3.) By this action the extension 31 of the arm 26, carried by the opposite end of the receptacle, impinges against the catch 55, bending its spring-arm sufficiently to cause said catch to release the head 33 of the closing-plate 30, whereupon the resilient controlling-spring 29 draws the plate 30 thus disengaged to a closing position—that is, drawing the opening 54 away from the mouth of the hopper. While the pan 11 is in its highest position the free end of the lever 21 is engaged by the pawl 53 of standard or tripping-bar 22, whereby the wedge-shaped plate 51 permits the (spring-controlled, if desirable) jaws 19 to close. When the pan is full and has reached its lowest position, the lever 21 engages the pawl 53', causing the wedge 51 to open the jaws and permit the contents of the pan to drop out and be caught in any convenient package, bag, or the like. As the contents of the pan thus escape the weight 17 will gradually drop, thus releasing one by one the series of weights 13 14 15 16, permitting the pan to come to its highest position, whereupon the series of operations can be repeated.

It will be seen that the mercury-receptacle is so constructed that whether it be tilted in one position or the other the level of the surface of the mercury is always in the same horizontal plane with the inclined bottom of the opposite end of the receptacle, whereby the slightest impact by the beam 5 against the end carrying the mercury will cause the latter to gradually shift to the opposite end of the receptacle and either close or open the hopper or pan, according to the position the receptacle occupies, and producing a remarkable constancy in the results. The mercury-receptacle being fulcrumed or pivoted independently of the beam 5 makes the apparatus extremely sensitive. Although I have described mercury as the shifting contents of the receptacle 7, it is apparent that any equivalent thereof which can successfully shift the center of gravity of the receptacle might be substituted. Shot may answer the purpose for a while; but this in time corrodes and the sensitiveness thereof becomes destroyed or impaired. The taking up or releasing of the weights 13 to 16 in succession also aids the beam in attaining the momentum necessary to the sufficient impact that the beam should exert against the receptacle 7.

Having described my invention, what I claim is—

1. In a weighing apparatus, a suitable weighing-beam, a tilting receptacle independent of said beam, a shifting liquid contents for said receptacle adapted to be shifted from one end of the receptacle to the other upon the successive tiltings of the weighing-beam, and mechanism arranged to be operated by such tilting receptacle, substantially as set forth.

2. In a weighing apparatus, a suitable weighing-beam, a tilting receptacle independent of said beam, a liquid contents for said receptacle for shifting the center of gravity of the receptacle with each oscillation of the same, and mechanism arranged to be operated by such tilting receptacle, substantially as set forth.

3. In a weighing apparatus, a suitable weighing-beam, a tilting receptacle independent of said beam actuated by the swinging of the beam, a mercury contents for said receptacle adapted to shift from one end of the receptacle to the other with each swing of the beam or tilting of the receptacle, a suitable source of supply for the material to be weighed, and intermediate connections between the mercury-receptacle and said source of supply whereby the latter is controlled with each oscillation of the receptacle, substantially as set forth.

4. In a weighing apparatus, a suitable receptacle pivoted at its medial portion, a bottom for the same inclining downward on each side from the pivotal line of the receptacle, means for limiting the degree of tilt or inclination for said receptacle, a mercury contents for said receptacle, the surface of said mercury when resting on the inclined bottom on one side of the pivotal line being substantially on a level with the inclined bottom on the opposite side of the pivotal line, whereby upon a sufficient impact against the bottom on which the mercury rests the latter will gradually shift to the opposite end of the receptacle, substantially as set forth.

5. In a weighing apparatus, a suitable weighing-beam pivoted on a suitable frame, a receptacle pivoted independently on said frame and actuated by the swinging of the beam, a mercury contents for said receptacle adapted to shift the center of gravity of the receptacle with each swing of the beam, a suitable source of supply for the material to be weighed, and intermediate connections between the receptacle and said source of supply for controlling the latter, substantially as set forth.

6. In a weighing apparatus, a suitable frame, a receptacle pivoted on the same and having a shifting contents, an oscillating or swinging beam actuating said receptacle, suitable arms carried by the frame and having adjustable bolts for limiting the degree of oscillation of the receptacle, a suitable hopper, a spring-actuated plate for closing and opening the mouth of said hopper, a conical head carried at one end of the plate, a spring-arm having a terminal catch adapted to engage the head, a trigger pivoted on the outer wall of the hopper and having one arm interposed permanently between the mouth of the hopper and the base of the conical head, an arm carried by the adjacent end of the receptacle, a finger carried at the end of the arm adapted to engage the second arm of the trigger upon oscillation of the receptacle in one direction, and an extension forming a part of the arm carried by the receptacle adapted to actuate the catch and release the conical head therefrom upon the oscillation of the receptacle in the opposite direction, substantially as set forth.

In testimony whereof I affix my signature in presence of two witnesses.

FRANKLIN W. OLIN.

Witnesses:
ALFRED A. MATHEY,
EMIL STAREK.